(12) United States Patent
Mattos

(10) Patent No.: US 8,102,311 B2
(45) Date of Patent: Jan. 24, 2012

(54) LOCATING SATELLITES

(75) Inventor: Philip Mattos, Ruardean (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 0 days.

(21) Appl. No.: 12/893,935

(22) Filed: Sep. 29, 2010

(65) Prior Publication Data

US 2011/0012785 A1 Jan. 20, 2011

Related U.S. Application Data

(63) Continuation of application No. 11/825,674, filed on Jul. 6, 2007, now Pat. No. 7,830,304.

(30) Foreign Application Priority Data

Jul. 7, 2006 (EP) ..................................... 06253569

(51) Int. Cl.
*G01S 19/27* (2010.01)
(52) U.S. Cl. .................................. 342/357.66
(58) Field of Classification Search .............. 342/357.66
See application file for complete search history.

(56) References Cited

U.S. PATENT DOCUMENTS

| | | | |
|---|---|---|---|
| 6,058,338 A | 5/2000 | Agashe et al. | |
| 6,211,819 B1 * | 4/2001 | King et al. ............... | 342/357.66 |
| 6,542,820 B2 | 4/2003 | LaMance et al. | |
| 6,560,534 B2 | 5/2003 | Abraham et al. | |
| 7,570,208 B2 | 8/2009 | Wang et al. | |
| 2002/0082774 A1 * | 6/2002 | Bloebaum ...................... | 701/213 |
| 2002/0143781 A1 * | 10/2002 | Lavoie et al. ................. | 707/100 |
| 2004/0263386 A1 | 12/2004 | King et al. | |
| 2006/0055598 A1 | 3/2006 | Garin et al. | |

FOREIGN PATENT DOCUMENTS

| | | |
|---|---|---|
| WO | WO 2004/099813 A1 | 11/2004 |
| WO | WO 2008/055223 A2 | 5/2008 |

OTHER PUBLICATIONS

European Search Report dated Nov. 2, 2010 in connection with European Patent Application No. EP 10 17 7728.

* cited by examiner

*Primary Examiner* — Harry Liu

(57) ABSTRACT

A system and method of locating the position of a satellite or a user using a satellite positioning system. The system and method includes receiving, at a terminal, satellite positioning data for at least one specified time period over a communications channel. In addition, the system includes storing, at the terminal, the satellite positioning data for the at least one specified time period. Responsive to an event at a later time, the system generally calculates, at the terminal, the satellite position at the later time based only on the satellite positioning data for the at least one specified time period.

18 Claims, 6 Drawing Sheets

LOCATING SATELLITES

This application is a continuation of prior U.S. patent application Ser. No. 11/825,674 filed on Jul. 6, 2007 now U.S. Pat. No. 7,830,304.

CROSS-REFERENCE TO RELATED APPLICATIONS

The present application is related to European Patent Application No. 06253569.5, filed Jul. 7, 2006, entitled "LOCATING SATELLITES". European Patent Application No. 06253569.5 is assigned to the assignee of the present application and is hereby incorporated by reference into the present disclosure as if fully set forth herein. The present application hereby claims priority under 35 U.S.C. §119(a) to European Patent Application No. 06253569.5.

TECHNICAL FIELD

The present disclosure relates generally to systems and methods of locating satellites, and in particular to the use of a satellite positioning system.

The use of satellite positioning systems is becoming increasingly common. Satellite positioning systems are being used in a variety of applications such as navigation (for example automotive navigation) and surveying. Dedicated satellite positioning system receivers are now relatively inexpensive and readily available to the consumer. In addition, satellite positioning system receivers are also now being integrated into mobile telephones, personal digital assistants ("PDA") and automotive computers, as well as being available as peripherals for personal computers.

An example of a satellite positioning system is the Global Positioning System ("GPS"), operated by the United States Department of Defense. The GPS system uses a satellite constellation of at least 24 satellites in a circular medium earth orbit ("MEO"), such that at least four satellites are within line of sight from almost any point on the Earth, and each satellite orbits the Earth twice every day. Other satellite positioning systems include the Russian Global Navigation System (GLONASS) and the European Galileo system.

A GPS receiver can determine its location in terms of its longitude, latitude and altitude (as well as its speed and the current time) by performing calculations on the signals broadcast from the satellites. The location of the receiver is calculated using a process known as trilateration.

Each satellite continuously transmits a coded identification signal, allowing a receiver to identify the satellite. Along with this signal, the satellite transmits a time signal (from an atomic clock on board the satellite), ephemeris data, and an "almanac" of the location of other satellites. Ephemeris data is a set of information that allows the receiver to calculate the movement of the satellite in orbit over a specific interval of time. Typically, the ephemeris data can enable the receiver to accurately calculate the position of the satellite at any given moment over a period of four hours. The ephemeris data allows a plot to be determined that describes how the satellite orbits the Earth. The plot is in the form of a curve or line which is a good fit for the satellite's orbit for approximately four hours, but for times after this the accuracy of the plot gradually degrades. The almanac is a description of the location of the other satellites in the constellation, but is not as accurate as the ephemeris data, and is used by the receiver to determine which other satellites it can see.

By reading the time signal from the satellites, the receiver can determine the distance from the satellites (known as the "pseudorange"). Therefore, the receiver can determine that its position is on the surface of an imaginary sphere centred on the location of the satellite. With signals from four (or more) satellites, the receiver can determine the intersection point of the four (or more) imaginary spheres, which gives the location of the receiver. If only three satellites are visible to the receiver, a two-dimensional location of the receiver can be calculated.

Ground stations based on the Earth monitor the precise locations of the satellites, and update the ephemeris data on the satellites to match the observations from the Earth. The ground stations also update the atomic clocks on the satellites to synchronise them.

A problem with GPS receivers is that they may typically take about 30 seconds to start up, because the receiver needs to download the ephemeris data broadcast from the satellites, in addition to measuring the timing. As mentioned, once loaded, the ephemeris data is valid for about four hours. However, after about an hour many satellites will have set or risen, so new data is required. This therefore incurs another delay as the new data is downloaded.

In addition, inside buildings or other areas where there is no line of sight to the satellites (such as "urban canyons"), the signal may be too weak to download the ephemeris data. In these situations the location of the receiver cannot be determined. A known solution to this problem is to use a communication link to fetch the ephemeris data from a server based on Earth (called assisted GPS). However, this requires the ability to connect to the server, which may not always be available. For example, if the connection is made using a cellular wireless connection, then there must be sufficient cellular coverage in the area and the receiver must have necessary hardware to connect to a cellular system. Alternatively, if the connection is via the Internet, then the receiver must have access to either a wired or wireless Internet connection, which may be inconvenient to the user and requires extra hardware in the receiver. Furthermore, the downloading of the ephemeris data from a server also incurs delay in determining the location of the receiver.

There is therefore a need for techniques to address the aforementioned problems by, for example, providing ephemeris data to a satellite positioning receiver.

SUMMARY

According to one aspect of the present disclosure there is provided a method of locating the position of a satellite in a satellite positioning system, including receiving, at a terminal, satellite positioning data for at least one specified time period over a communications channel; storing, at the terminal, the satellite positioning data for the at least one specified time period; and responsive to an event at a later time, calculating, at the terminal, the satellite position at the later time based only on the satellite positioning data for the at least one specified time period.

Preferably, said later time is outside said at least one specified time period. In addition, the satellite positioning data for the at least one specified time period preferably includes ephemeris data for a first time period received at a first time, ephemeris data for a second time period received at a second time, and ephemeris data for a third time period received at a third time.

Preferably, the method includes estimating positions of the satellite at the first and second times using the ephemeris data for the third time period and calculating errors in the estimated positions at the first time using the ephemeris data for the first time period and at the second time using the ephemeris data for the second time period.

In one embodiment, the step of calculating includes fitting a curve to the errors and using the curve to give an extrapolated error value at the later time and calculating the position of the satellite at the later time from the ephemeris data for the third time period and the extrapolated error value. In another embodiment, the third time is earlier than the first and second time. In another embodiment, the third time is more recent than the first and second time.

In another embodiment, the method further includes fitting a curve to the errors and storing parameters defining the curve at the user terminal. The method also includes removing the ephemeris data for the first and second time period stored at the terminal. Preferably, the step of calculating includes creating a curve from the parameters using the curve to give an extrapolated error value at the later time and calculating the position of the satellite at the later time from the ephemeris data for the third time period and the extrapolated error value. Preferably, the third time is more recent than the first and second time.

Preferably, the event is a user actuated event.

According to another aspect of the present disclosure there is provided a terminal for locating the position of a satellite in a satellite positioning system, comprising: means for receiving satellite positioning data for at least one specified time period over a communications channel; means for storing the satellite positioning data for the at least one specified time period; and means for calculating, responsive to an event at a later time, the satellite position at the further time based only on the satellite positioning data for the at least one specified time period.

According to another aspect of the present disclosure there is provided a method of determining the local position of a user of a terminal at the request of the user, comprising: calculating, at the terminal, the position of a satellite in a satellite positioning system at a time of the request based only on satellite positioning data previously received at the terminal for at least one specified time period over a communications channel and stored at the terminal.

According to another aspect of the present disclosure there is provided a method of calculating the position of a satellite in a satellite positioning system, comprising: receiving, at a terminal, satellite positioning data for at least one specified time period over a communications channel; storing, at the terminal, the satellite positioning data for the at least one specified time period; requesting the position of the satellite at a further time, said further time being outside the at least one specified time period; and calculating, at the terminal, the satellite position at the further time based only on the satellite positioning data for the at least one specified time period.

According to another aspect of the present disclosure there is provided a global positioning system (GPS) receiver for locating the position of a satellite in a global positioning system, comprising: means for receiving satellite positioning data for at least one specified time period over a communications channel; means for storing the satellite positioning data for the at least one specified time period; and means for calculating, responsive to an event at a later time, the satellite position at the further time based only on the satellite positioning data for the at least one specified time period.

According to another aspect of the present disclosure there is provided a Glonass receiver for locating the position of a satellite in a Glonass positioning system, comprising: means for receiving satellite positioning data for at least one specified time period over a communications channel; means for storing the satellite positioning data for the at least one specified time period; and means for calculating, responsive to an event at a later time, the satellite position at the further time based only on the satellite positioning data for the at least one specified time period.

According to another aspect of the present disclosure there is provided a Galileo receiver for locating the position of a satellite in a Galileo positioning system, comprising: means for receiving satellite positioning data for at least one specified time period over a communications channel; means for storing the satellite positioning data for the at least one specified time period; and means for calculating, responsive to an event at a later time, the satellite position at the further time based only on the satellite positioning data for the at least one specified time period.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
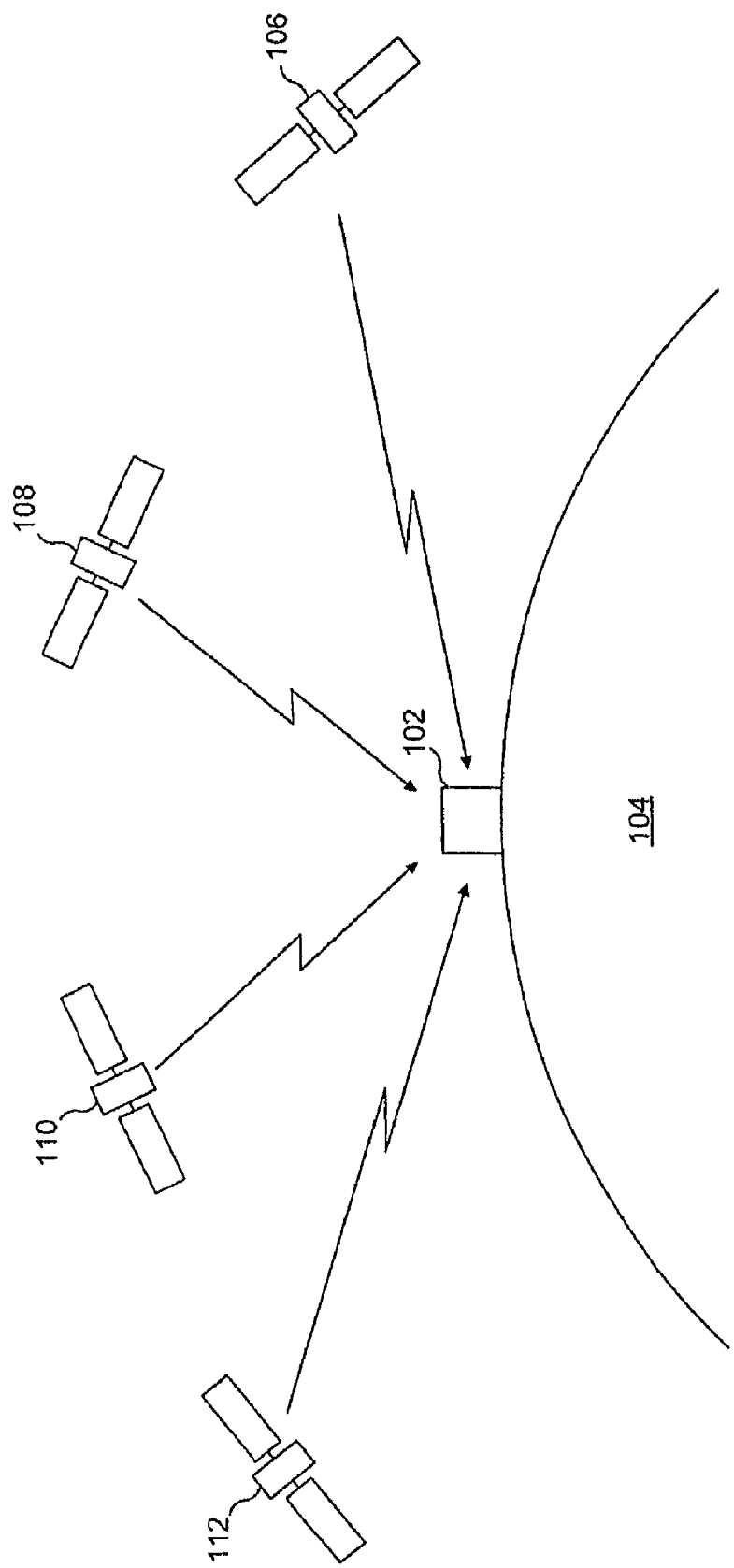
FIG. 1 shows a receiver terminal receiving data from four satellites of a satellite positioning system according to one embodiment of the present disclosure.

Reference is first made to FIG. 1, which illustrates a receiver terminal 102 receiving data from four satellites 106-112 of a satellite positioning system. The user of the terminal 102 wishes to know their location on the Earth 104. In one embodiment, the terminal is a GPS receiver. The terminal can be, for example, a dedicated GPS receiver, a mobile telephone or PDA with GPS hardware, or a vehicle with a built-in GPS receiver. Other satellite positioning systems other than GPS could also be used. In an alternative embodiment, the terminal is a GLONASS receiver. In a further alternative embodiment, the terminal is a Galileo receiver.

The terminal receives signals, which include the time signal and ephemeris data from each of the four satellites 106-112 that the terminal has in its line of sight. From this data, the terminal calculates its position, as described previously.

Figure 2:
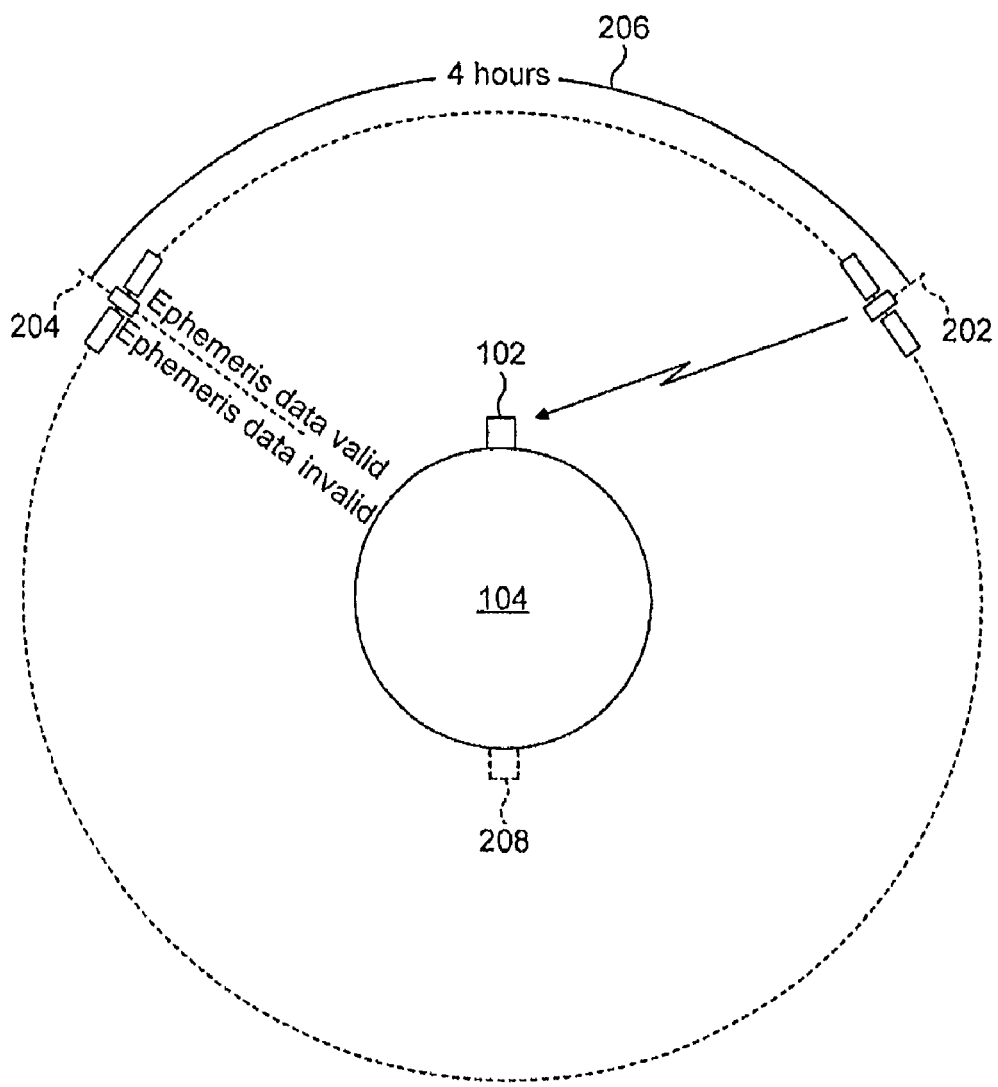
FIG. 2 shows a period over which ephemeris data is valid for a satellite according to one embodiment of the present disclosure.

As mentioned above, the ephemeris data for each satellite enables the terminal to make predictions of the satellite's orbit for a specified time period into the future. For example, this may predict the satellite's orbit for the next four hours, as illustrated in FIG. 2. At the time that the ephemeris data was downloaded, the satellite was at the position 202 in its orbit. The ephemeris data is valid for the specified time period, at which point the satellite has moved in its orbit to the position 204, as illustrated by the arrow 206 (which may, for example, correspond to four hours). If the terminal requires the ephemeris data during this time period until the satellite reaches 204, then the current ephemeris data can be used without downloading new data.

After the specified time period at which the satellite has reached 204 the ephemeris data ceases to be valid. If the terminal requires ephemeris data once the specified period has passed, then new data will need to be downloaded from the satellite. The same situation occurs for each of the satellites 106-112 in FIG. 1.

However, the parameters of the satellite orbit vary very little from orbit to orbit over the same point on the ground, as essentially the effects of the Sun and Gravity are the same every day, and the gravitational effect of the moon changes little due to its 29 day period. As the satellite makes two orbits per day, the satellite passes the same point on the ground every two orbits. Therefore, the same ephemeris data can be used an even number of orbits later with only a small error, but cannot be used on any other pass as the control centre curve fit is optimised for only that part of the earth/orbit combination, nominally four hours. In other words, the ephemeris data for the time period illustrated in FIG. 2, over which the satellite moves from 202 to 204 in its orbit, will also be valid (apart from the small errors) for the same time period an even number of orbits later. For example, if the satellite is considered to start its first orbit from position 202, then when the satellite has completed exactly one orbit of the Earth (approximately 12 hours) in FIG. 2, the satellite is again at position 202. However, the Earth has also been rotating, and the terminal is now at location 208, and hence cannot see the satellite. One further orbit later (i.e. the second orbit) and the satellite is again at 202 and the terminal is again at position 102, and the ephemeris data can be reused until the satellite moves to position 204. Therefore, every two orbits of the Earth, the same ephemeris data can be utilised by a terminal.

Note that an even number of orbits corresponds approximately with an integer number of days (although in practice the satellite orbits the same point on the ground approximately four minutes later each day).

Hence, if the ephemeris data is stored on the terminal, and provided the errors arising due to drift from one orbit to another can be removed, the ephemeris data can be used an integer even number of orbits later in the equivalent time period in which it was valid, without needing to be downloaded from the satellite, thereby reducing the start-up delay, and allowing the terminal to be used indoors, where the signal to the satellite may be weak.

This technique is obviously limited to the equivalent time period in which the ephemeris data was valid an even number of orbits following the original download of the ephemeris data. It would be possible to store the ephemeris data for the necessary satellites over all the required time periods, but this would require a substantial amount of storage.

A technique has been developed to estimate the errors introduced by the drift in the orbit of the satellite, which thereby enables the use of old ephemeris data at time periods that are an even integer number of orbits since the old ephemeris data was acquired. This is achieved by modelling the satellite drift using a multiple of previously stored ephemeredes. This allows a terminal that is used several times a week (and has downloaded ephemeris data at these times if available) to operate immediately, whether inside a building or not, and without a communications link (either to a satellite or a server).

Figure 3:
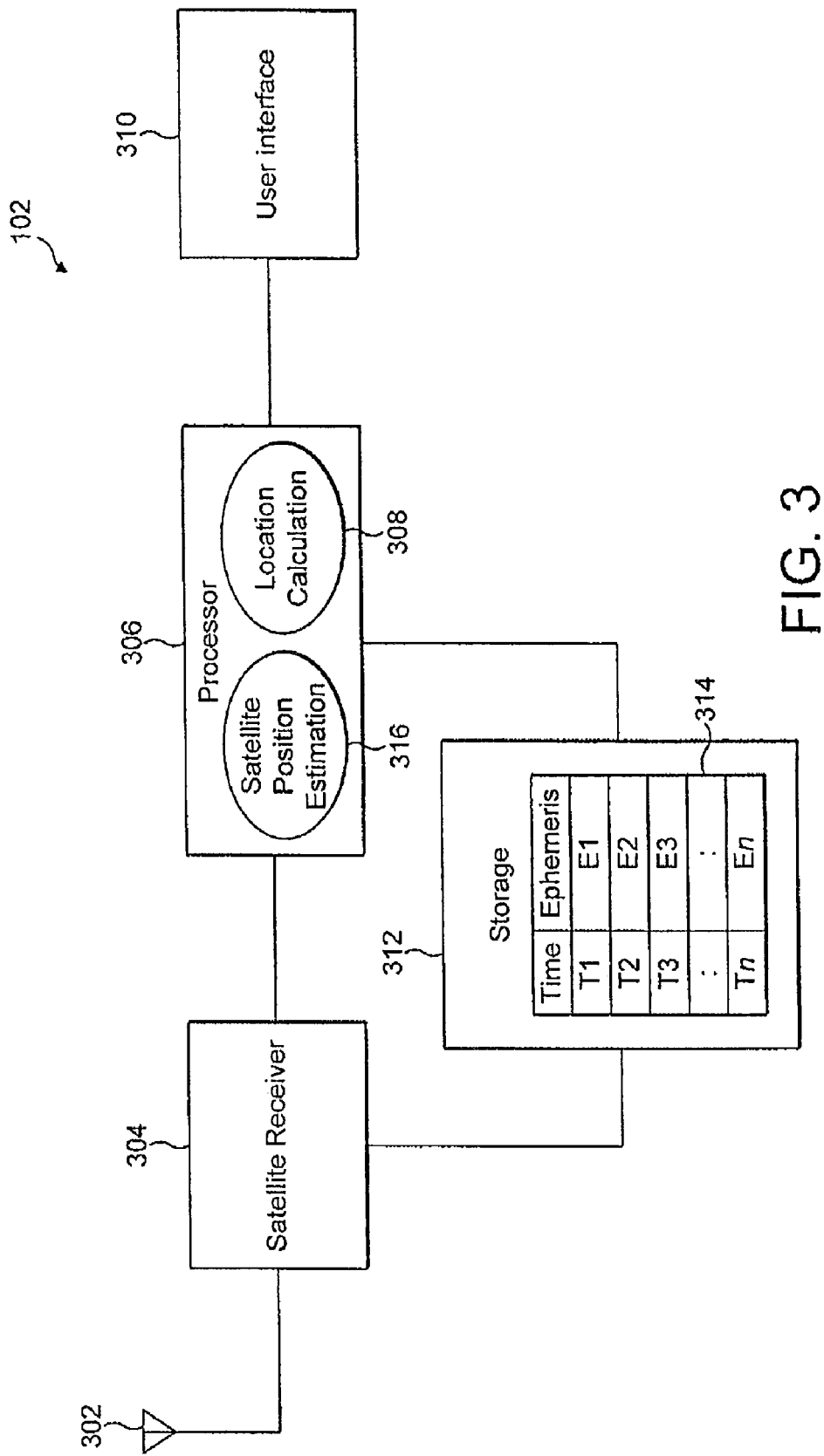
FIG. 3 shows a terminal in a satellite positioning system that calculates a satellite position from stored ephemeris data according to one embodiment of the present disclosure.

Reference is now made to FIG. 3, which illustrates a terminal 102 in a satellite positioning system that calculates the position of a satellite from old ephemeris data. The terminal 102 comprises an antenna 302 that is used to receive radio frequency information from the satellites in orbit when they are visible to the user, and a satellite receiver 304 for receiving the radio frequency signals from the antenna 302 and decoding them to retrieve the information (which includes the ephemeris data). The information in the signals from the satellites is passed to a processor 306, which uses location calculation software 308 to calculate the location of the terminal (in the manner described hereinbefore). The terminal location can be displayed to a user on a user interface 310. The user interface 310 may comprise a screen for displaying coordinates, or a map, or other means of identifying the location to the user. The user interface 310 may also comprise buttons or a touch-sensitive screen that the user can use to control the operation of the terminal 102.

In addition to passing the information in the signals from the satellites (which includes the ephemeris data) to the processor 306, the satellite receiver 304 also passes the information to a storage block 312. The storage block 312 may comprise memory or a recordable medium such as a magnetic disk. The storage block 312 records the ephemeris data for the satellite against the time that the ephemeris data was obtained, as illustrated by the table 314. The table 314 may store any number of previously downloaded ephemeredes, and in the table 314 illustrated in FIG. 3 there are n ephemeredes stored for n times. The storage block 312 can provide any of the stored ephemeredes to the processor 306 as required, and the processor can use this information in an satellite position estimation function 316 to estimate the current position of the satellite if the ephemeris data cannot (or need not) be downloaded from the satellite (as will be described in more detail hereinafter). The estimated satellite position can then be used by the processor 306 in the location calculation function 308, and the location presented to the user on the user interface 310.

The terminal may be arranged to store a specific number of past ephemeredes. For example, in a first embodiment described hereinafter, the terminal may always store the three most recent ephemeredes that were downloaded by the terminal. Alternatively, in a second embodiment described hereinafter, the terminal may only store one complete recent ephemeris, and a set of parameters describing the position of the satellite at other reference times.

The method for determining the ephemeris data for a satellite using a history of old ephemeris data will now be described. A first embodiment is illustrated with reference to the flowchart in FIG. 4. In step S402, an event occurs that requires the terminal to determine the position of the satellite. Such an event can include, for example, the terminal being switched on, the user requesting a location, an automated scheduled location determination, or a trigger from an external sensor. In step S404, the terminal checks whether two or more previous sets of ephemeredes are stored at the terminal. If less than two previous sets of ephemeredes are stored, then the technique for calculating the satellite position using old ephemeris data cannot be used, and the terminal must download the ephemeris data for the current time from the satellite in step S406. The terminal stores this ephemeris data in the storage block 312 in step S408, and uses the downloaded ephemeris data to calculate the position of the satellite at step S410. The position of the terminal can then be calculated in step S412 using known methods described previously. As stated previously, this has the disadvantage of having a significant start-up delay, and requires a good signal from the satellite.

Figure 4:
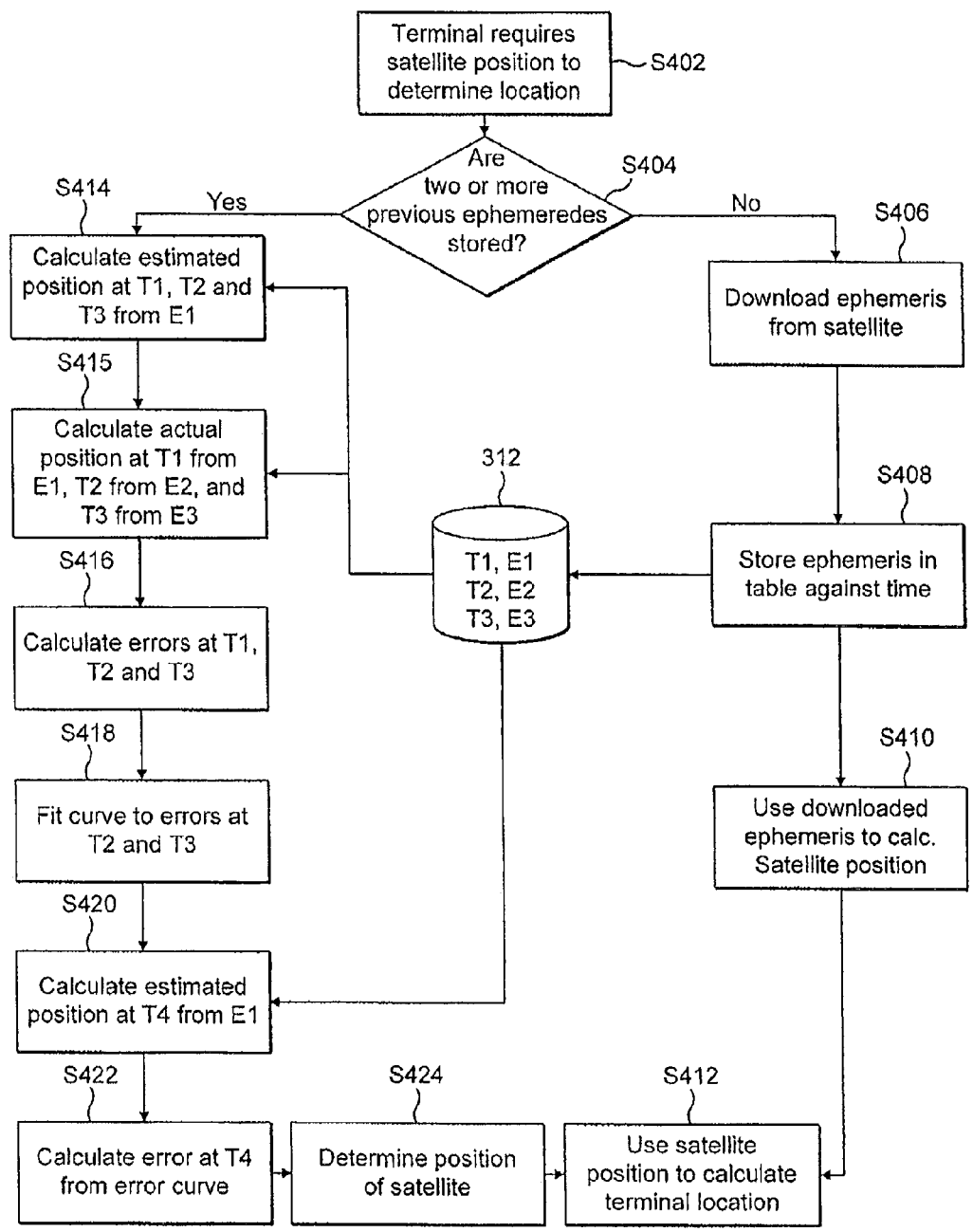
FIG. 4 shows a flowchart of a first embodiment for determining satellite position from stored ephemeris data according to one embodiment of the present disclosure.

If, however, it is determined in step S404 that the storage block 312 has stored a history of two or more sets of ephemeris data from two or more different times in the past, then the ephemeris data need not be downloaded from the satellite. If three sets of ephemeris data are present, then the steps illustrated in S414 to S424 are performed. If, however, only two sets of ephemeris data are present, then similar steps as in S414 to S424 can also be performed, but rather than fitting a curve to the calculated errors through three points, the error is estimated by fitting a straight line through two points. This is less accurate than using three sets of ephemeris data, but has the advantage of only needing two sets of ephemeris data to be stored. For clarity reasons, only the case where three sets of ephemeris data are present is illustrated in FIG. 4, as described below.

The ephemeris data is stored in the table 314 from previous downloads, and is denoted ephemeris data E1 for time T1, ephemeris data E2 for time T2, and ephemeris data E3 for time T3, for the purposes of this explanation. The current time for which the position of the satellite needs to be known is denoted T4, where T4 is outside the valid period specified in E3.

T4 may typically be an even integer number of orbits later than the most recent ephemeris data E3, as the satellite is seen once each day, but makes two orbits per day. Note, however, that some satellites are seen twice per day, and for these twice the data would be required (although this circumstance is not considered here for clarity).

Using the three ephemeris data sets stored in the table 314 (E1, E2, E3 at T1, T2, T3 respectively), the position of the satellite for time T4 (denoted P4) can be estimated in steps S414-S424.

The position of the satellite P4 is determined by characterising the rate of drift of the orbit (in other words how the orbit changes from one orbit to another, and hence the growth of the error from the stored ephemeris data over time), and propagating the orbit from the stored ephemeris data, to both first and second order. These parameters are then used to calculate. P4 and remove the errors introduced by the orbital drift.

The errors introduced by the drift in the orbit of the satellite may be assumed to be symmetrical, such that the errors going forward in time and those going backwards in time are symmetrical. However, under some circumstances, it may be desirable not to rely on this symmetry. Without relying on forward/backward error growth symmetry, only ephemeris data E1 (the oldest ephemeris data) would be used throughout, estimating the errors forward in time at T2 and T3, creating the error propagation polynomial (as described below), and propagating it further to T4.

The first step (S414) in the estimation of P4 is to use the ephemeris data E1 to calculate the position of the satellite (in terms of x, y and z coordinates) at times T1, T2 and T3. The position at time T1 will, of course, be accurate as E1 is the correct ephemeris data for this time. However, the position at time T2 and T3 is an estimation, as ephemeris E1 is not accurate at times T2 and T3. In step S415, the actual positions of the satellite at each of times T1, T2 and T3 are calculated from the correct ephemeredes for these times. Therefore, the position at T1 is calculated from E1 (which is the same as that calculated in the previous step), the position at T2 is calculated from E2, and the position at T3 is calculated from E3. The positions calculated in step S414 for T1, T2 and T3 are then compared in step S416 to the actual position of the satellite from step S415 at T1, T2 and T3. The difference between the estimated and actual position for T1 is zero, as these were both calculated using E1. However, the comparison between the estimated and actual position at T2 and T3 give two sets of error values for x, y, and z, denoted Δx, Δy and Δz (one set for T2 and one set for T3). In step S418, a second order polynomial is fitted to the error values (i.e. the zero error at T1 and the error values at T2 and T3) to give a curve (which can be curved or linear) that defines how the error (i.e. the orbital drift) changes with time. The error curve is, by definition, perfect at T2 and T3 as these points are used in the curve fitting process (which is not over-determined as minimum number of data points are used to fit the polynomial). The position of the satellite at T4 is then estimated using the ephemeris data E1 in step S420, and the error curve is used to estimate the error at T4 in step S422. The error at T4 is then applied to the estimated position to give the corrected position of the satellite P4 at time T4 in step S424.

Note, however, that time T1 (the time of the oldest ephemeris data) may be quite some time in the past. Therefore, in a variation to the embodiment shown in FIG. 4, if error growth symmetry can be assumed, it is more accurate to use the data E3 from time T3 (the most recent ephemeris data) to create a curve fitted (backwards in time) to E1 at T1 and E2 at T2, and then propagate in the opposite direction (i.e. forwards in time) to the required time of T4. This gives rise to a much lower propagation interval. The process for doing this is the same as that shown in FIG. 4, except that E3 is used to estimate the position at T1, T2 and T3 in step S414, the curve is fitted to the errors at T1 and T2 (and the zero error at T3) in step S418, and the position at T4 is calculated from E3 in step S420.

As mentioned previously, in a further alternative embodiment to that shown in FIG. 4, the above steps S414-S424 can also be performed with only two sets of stored ephemeris data. This means that step S414 calculates the estimated position at T1 and T2 from E1, step S415 calculates the actual position at T1 from E1 and T2 from E2, and step S416 determines the error between the actual and estimated position at T1 and T2 (which will be zero at T1). Then, rather than fitting a curve through the errors in step S418, a straight line is plotted through the two error values, and this is used to calculate the error at the current time and thus the position of the satellite, as in steps S420 to S424.

Once the determination of P4 is complete, the information can be used in the known way to determine the location of the terminal in step S412.

Figure 5:
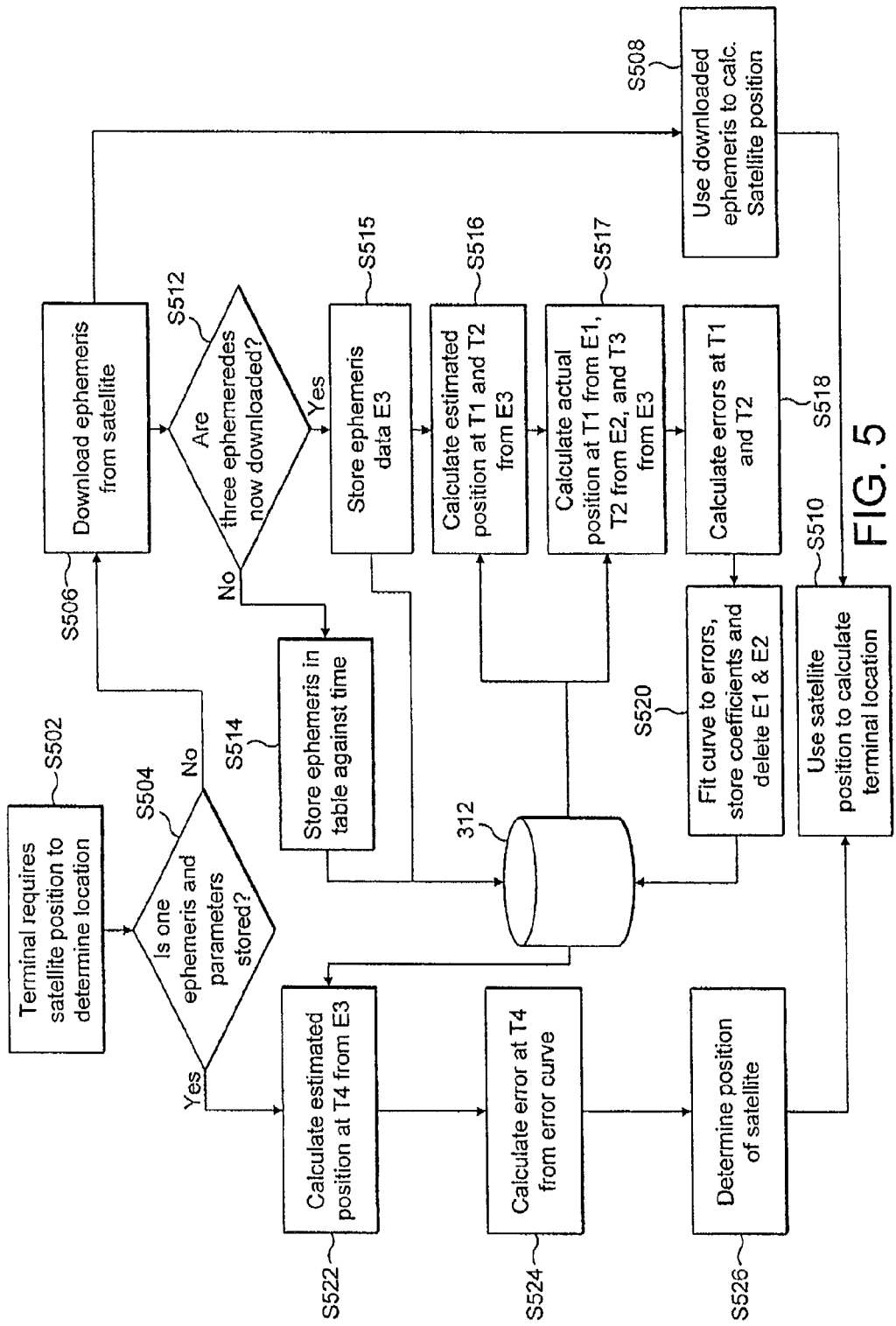
FIG. 5 shows a flowchart of a second embodiment for determining satellite position from stored ephemeris data according to one embodiment of the present disclosure.

A second embodiment is shown illustrated in FIG. 5. The second embodiment improves on the embodiment shown in FIG. 4 in two ways. Firstly, with the first embodiment illustrated in FIG. 4, three sets of ephemeredes need to be stored. This may take a significant amount of memory, which may be a problem for certain types of devices, such as mobile terminals. The second embodiment describes a technique of storing only one set of ephemeris data plus some error parameters, thereby minimising the memory requirements. This assumes forward/backward error growth symmetry, and exploits this to save data storage space. Secondly, as mentioned above, error growth symmetry can be assumed and this is used advantageously to give a lower propagation interval by using the data E3 from time T3 (the most recent ephemeris data) to create a curve fitted (backwards in time) to T1 and T2, and then propagate in the opposite direction (i.e. forwards in time) to the required time of T4.

In step S502, an event occurs that requires the terminal to determine the position of the satellite (for example the terminal being switched on or the user requesting a location). In step S504, the terminal checks whether one previous ephemeris data and a set of error parameters are stored at the terminal. If not, then the technique for calculating the satellite position using old ephemeris data cannot be used, and the terminal must download the ephemeris data from the satellite at step S506. The terminal can use the downloaded ephemeris data to calculate the position of the satellite in step S508 and subsequently the location of the terminal at S510. As stated previously, this has the disadvantage of having a significant start-up delay, and requires a good signal from the satellite.

Following the download of the ephemeris data, the terminal also checks whether it has now downloaded three sets of ephemeris data in step S512. If it has not, the terminal simply stores the downloaded ephemeris data in the storage block 312 in step S514. If, however, it is determined in step S512 that three sets of ephemeris data have been obtained, then the errors due to the satellite drift may be calculated. Note also that, in an alternative embodiment, the terminal can estimate the satellite position using only two sets of error values obtained from two stored ephemeredes. This is achieved by modifying step S512 to determine if two ephemeredes are stored, calculating two errors in steps S516 to S518, and plotting a straight line through the two errors in step S520, in a similar manner to that described previously with reference to FIG. 4. This alternative embodiment is not illustrated in FIG. 5 for clarity.

In step S515 the ephemeris data downloaded in step S506 (E3) is stored in the storage block 312. In step S516 the position of the satellite at times T1 and T2 are calculated from E3. In step S517 the actual position of the satellite at T1 is calculated from E1, the position at T2 is calculated from E2, and the position at T3 is calculated from E3. The errors in the estimation at T1 and T2 are calculated in step S518. Then, in step S520 an error curve fit (propagated back from E3) is performed to T1, T2 and T3 (where the error is zero), as described previously. Once a curve fit to times T1, T2 and T3 has been achieved, only the polynomial parameters need to be saved in the storage block 312, and E1 and E2 can be deleted. The polynomial parameters saved are first and second order coefficients describing the curve fitting to the two sets of Δx, Δy, Δz, and Δt (total 8 coefficients, where t is the reference time for that database) plus the timestamps T1, T2.

Therefore, when the terminal wishes to determine the position of the satellite, and it is determined in step S504 that the most recent ephemeris data (E3) and the above coefficients are stored in the storage block, the ephemeris data need not be downloaded from the satellite. The position of the satellite P4 can be calculated by using the most recent ephemeris data E3 to estimate the position of the satellite in step S522, and the error at T4 is calculated using the polynomial parameters that define the error curve stored in the storage block 312 in step S524. The position of the satellite can then be determined in step S526, and this can then be used as described previously to determine the location of the terminal in step S510.

Figure 6:
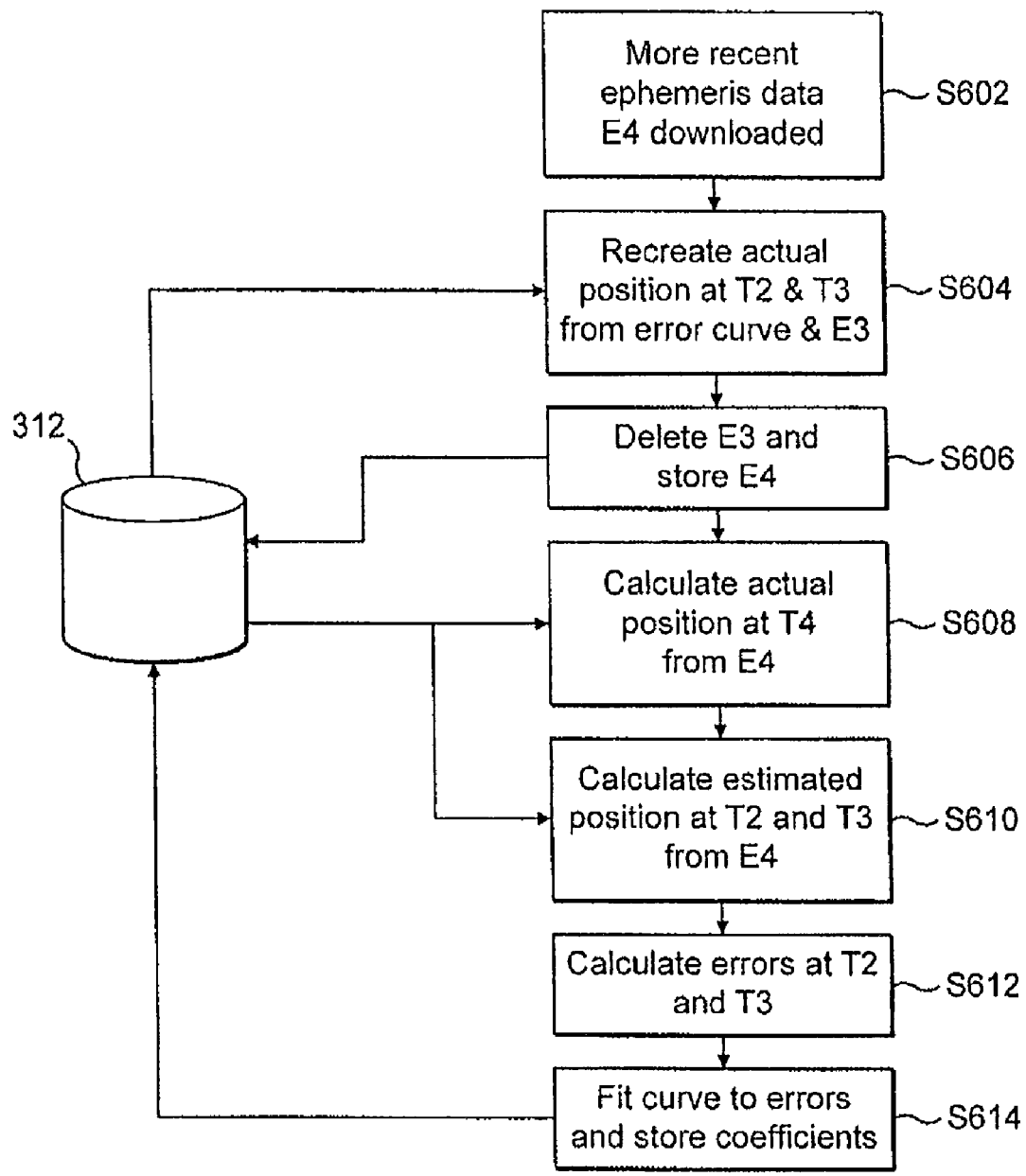
FIG. 6 shows a flowchart of an ephemeris updating procedure according to one embodiment of the present disclosure.

The parameters used to determine the satellite position can also be updated as new, more recent, ephemeris data becomes available to the terminal. FIG. 6 illustrates an update procedure for updating the stored parameters when a new ephemeris is downloaded. In step S602, a new (i.e. more recent) ephemeris data (E4) is downloaded. In step S604 the actual positions of the satellite at T2 and T3 are recreated using the curve from the stored parameters (with no error as the curve fit is not over-determined, as mentioned previously) and the stored E3, without having E1 and E2 still in memory. Following this step E3 is no longer required, and can be deleted and replaced with E4 in step S606 to save storage space. In step S608 the actual position of the satellite at time T4 is calculated from E4. The estimated position of the satellite at T2 and T3 can then be calculated from E4 in step S610, and compared to the actual positions to determine the errors in step S612. In step S614 a curve is fitted to the errors at T2, T3 and T4 (which is zero) and the parameters stored. When the new ephemeris data (E4) has been downloaded and the terminal is processing the information to create the error curve, only the x, y, z, t location (not the error values) for E3/T3 needs be retained so that the error curve can be calculated, and once the new parameters are computed, this too can be deleted.

The above described embodiment therefore enables a satellite position to be determined by the terminal without the terminal requiring the ephemeris data to be downloaded from the satellite at that time, or requiring the terminal to have access to another communication channel. This enables the terminal to be used in indoor environments, and gives a start-up time equivalent to a "hotstart", i.e. as if the data was already loaded.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of for determining parameters used to determine a position of a satellite comprising:
    downloading new satellite positioning data;
    recreating a plurality of prior actual positions of said satellite at a corresponding plurality of prior times using a previously stored set of parameters and said new satellite positioning data;
    storing said new satellite positioning data;
    calculating an actual position of said satellite at a present time from said new satellite positioning data;
    calculating a prior estimated position of said satellite for each of said plurality of prior times using said new satellite positioning data;
    calculating an error in said prior estimated position for each of said plurality of prior times; and
    fitting a curve to said errors and storing coefficients describing said curve as an updated set of parameters.

2. The method of claim 1 wherein said new satellite positioning data comprises ephemeris data.

3. The method of claim 1 wherein once said updated set of parameters has been stored, said fitted curve is deleted.

4. The method of claim 1 wherein a previously stored satellite positioning data is deleted when said new satellite positioning data is stored.

5. The method of claim 1 further comprising using said plurality of prior actual positions and said plurality of prior estimated positions to calculate said errors.

6. The method of claim 1 further comprising replacing said stored set of parameters with said updated set of parameters.

7. The method of claim 1 wherein said satellite is one of a European Galileo satellite, Russian Global Navigation System (GLONASS) satellite, or a United States Global Positioning System (GPS) satellite.

8. The method of claim 1 wherein said new satellite positioning data is downloaded from said satellite.

9. A terminal configured to determine parameters used to determine a position of a satellite, the terminal configured to:
   download new satellite positioning data;
   recreate a plurality of prior actual positions of said satellite at a corresponding plurality of prior times using a previously stored set of parameters and said new satellite positioning data;
   store said new satellite positioning data;
   calculating an actual position of said satellite at a present time from said new satellite positioning data;
   calculating a prior estimated position of said satellite for each of said plurality of prior times using said new ephemeris data;
   calculate an error in said prior estimated position for each of said plurality of prior times; and
   fit a curve to said errors and storing coefficients describing said curve as an updated set of parameters.

10. The terminal of claim 9 wherein said new satellite positioning data comprises ephemeris data.

11. The terminal of claim 9 wherein once updated set of parameters has been stored, said fitted curve is deleted.

12. The terminal of claim 9 wherein a previously stored satellite positioning data is deleted when said new satellite positioning data is stored.

13. The terminal of claim 9 further configured to use said plurality of prior actual positions and said plurality of prior estimated positions to calculate said errors.

14. The terminal of claim 9 further configured to replace said stored set of parameters with said updated set of parameters.

15. The terminal of claim 9 wherein said satellite is one of a European Galileo satellite, Russian Global Navigation System (GLONASS) satellite, or a United States Global Positioning System (GPS) satellite.

16. A terminal for determining parameters used to determine a position of a satellite, the terminal comprising:
   means for downloading new satellite positioning data;
   means for recreating a plurality of prior actual positions of said satellite at a corresponding plurality of prior times using a previously stored set of parameters and said new satellite positioning data;
   means for storing said new satellite positioning data;
   means for calculating an actual position of said satellite at a present time from said new satellite positioning data;
   means for calculating a prior estimated position of said satellite for each of said plurality of prior times using said new satellite positioning data;
   means for calculating an error in said prior estimated position for each of said plurality of prior times; and
   means for fitting a curve to said errors and storing coefficients describing said curve as an updated set of parameters.

17. A terminal configured to locate a position of a satellite in a satellite positioning system, the terminal comprising:
   a receiver configured to receive new satellite positioning data for at least one specified time period over a communications channel;
   a memory configured to store said new satellite positioning data and a set of parameters, wherein said parameters describe positions of said satellite for other time periods; and
   a calculator configured to calculate, responsive to an event at a later time, a satellite position at the later time based on said new satellite positioning data and said set of parameters,
   the terminal further configured to update said stored set of parameters by:
      calculating an actual position of said satellite at a present time from said new satellite positioning data;
      calculating a prior estimated position of said satellite for each of a plurality of prior times using said new satellite positioning data;
      calculating an error in said prior estimated position for each of said plurality of prior times; and
      fitting a curve to said errors and storing coefficients describing said curve as an updated set of parameters.

18. A method of locating a position of a satellite in a satellite positioning system comprising:
   receiving, at a terminal, new satellite positioning data for at least one specified time period over a communications channel;
   storing, at said terminal, said new satellite positioning data and a set of parameters, wherein said parameters describe positions of the satellite for other time periods;
   responsive to an event at a later time, calculating, at said terminal, a satellite position at the later time based on said new satellite positioning data and said set of parameters;
   calculating an actual position of said satellite at a present time from said new satellite positioning data;
   calculating a prior estimated position of said satellite for each of a plurality of prior times using said new satellite positioning data;
   calculating an error in said prior estimated positions for each of said plurality of prior times; and
   fitting a curve to said errors and storing coefficients describing said curve as an updated set of parameters.

* * * * *